Aug. 21, 1962 R. W. BURHANS 3,050,252
ELECTRIC ANALOG INTERPOLATION APPARATUS
Filed Oct. 1, 1958 3 Sheets-Sheet 1
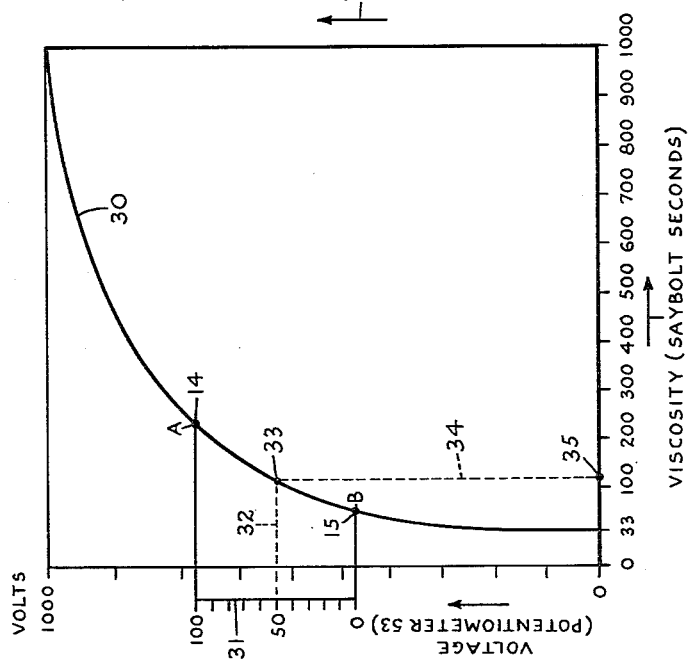
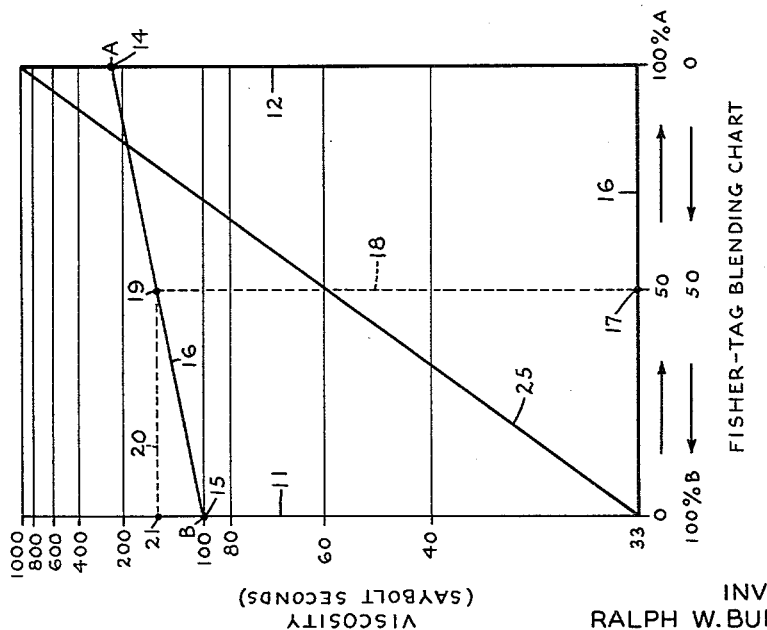
INVENTOR
RALPH W. BURHANS
BY
Brumbaugh, Free,
Graves & Donohue
HIS ATTORNEYS Aug. 21, 1962 R. W. BURHANS 3,050,252
ELECTRIC ANALOG INTERPOLATION APPARATUS
Filed Oct. 1, 1958 3 Sheets-Sheet 2

INVENTOR
RALPH W. BURHANS
BY
Brumbaugh, Free
Graves & Donohue
HIS ATTORNEYS

Aug. 21, 1962 R. W. BURHANS 3,050,252
ELECTRIC ANALOG INTERPOLATION APPARATUS
Filed Oct. 1, 1958 3 Sheets-Sheet 3

INVENTOR
RALPH W. BURHANS
BY
HIS ATTORNEYS

United States Patent Office 3,050,252
Patented Aug. 21, 1962

3,050,252
ELECTRIC ANALOG INTERPOLATION
APPARATUS
Ralph W. Burhans, Chagrin Falls, Ohio, assignor to The Standard Oil Company, Cleveland, Ohio, a corporation of Ohio
Filed Oct. 1, 1958, Ser. No. 764,651
9 Claims. (Cl. 235—179)

This invention relates generally to electric analog computer devices, and more particularly to devices of this sort adapted to simulate the mathematical operation of interpolation between two known value points of a non-linear function.

What is meant herein by a non-linear function is as follows. Assume that a dependent variable $y$ is functionally related to an independent variable $x$. The variable $y$ is considered to be a non-linear function of the variable $x$ if, when $y$ is plotted against $x$ in a graph employing rectangular X, Y cordinates, the plot so obtained is in the form of a continuous and curved line rather than a straight line. In a graphical sense, this curved line may be considered to represent the non-linear function, and the function may be said to be defined by a series of $(x, y)$ value points on the curved line.

In dealing with non-linear functions, it is often the case (and particularly where the non-linear function is an empirical function derived from experimental data) that, say, two adjacent value points of the function are known, but that points intermediate these two known value points are unknown. In this instance, resort is commonly had to interpolation methods for the purpose of determining the unknown value points.

As a specific example of where such interpolation methods are used, in petroleum refining the manufacture of lubricant products is accomplished by mixing together a lubricant constituent A, having one value of viscosity with a lubricant constituent B, having a different viscosity value, to thereby form a lubricant blend. Obviously, the viscoosity of the blend will be functionally related to the relative percentage contents in the mixture of the constituents A and B and to the respective viscosities thereof. However, this relationship between the viscosity of a blend and the relative percentage contents and viscosities of the constituents thereof is a non-linear, empirical relationship. Therefore, it is not possible by simple mathematics to calculate in advance the viscosity value of a blend to be formed by mixing together in predetermined relative percentage relation the constituents A and B of predetermined respective viscosities.

In the past, petroleum technologists have overcome this problem by employing what is known as a Fisher-Tag chart. For an understanding of a Fisher-Tag chart, reference is made to the accompanying FIGURE 1 which shows one such chart in simplified form. In the chart, the numbers forming the non-linear vertical scale are numbers signifying oil viscosity in Saybolt seconds. The numbers in the linear horizontal scale signify different percentage mixtures of constituents A and B, as, say, 50% of A and 50% of B, or 25% of A and 75% of B.

The Fisher-Tag chart is used as follows. Assume that it is desired to blend together an oil A having a viscosity of 250 Saybolt seconds and an oil B having a viscosity of 100 Saybolt seconds. The oil A corresponds on the horizontal scale to 100% A and 0% B. Thus, the viscosity value of the pure oil A is represented on the chart by a point 14 which is placed on the right-hand vertical ordinate 12 opposite the viscosity value of 250 Saybolt seconds. The pure oil B corresponds on the horizontal scale to 100% B and 0% A. Thus, the pure oil B is represented on the chart by the point 15 which is placed on the left-hand vertical ordinate 11 opposite the value of 100 Saybolt seconds. After the points 14 and 15 have been so located, a straight line 16 is drawn to connect such points.

Assume now that it is desired to determine the viscosity of the mixture formed of 50% of oil A and 50% of oil B. This determination is made by entering the chart on the horizontal base line 16 at the point 17 which indicates a 50%, 50% mixture according to the horizontal scale, constructing from point 17 a vertical line 18 which intercepts line 16 at point 19, constructing from point 19 a horizontal line 20 which intercepts the vertical ordinate 11 at a point 21, and reading off from the vertical viscosity scale the viscosity value represented by the point 21. In like manner, a determination of viscosity value can be made for any given relative percentage blend of the oils A and B. Also, assuming some particular viscosity value is desired for a blend of oils A and B, it is possible to determine the relative percentages of A and B which must be blended together to produce this desired value. Such determination is made by carrying out the above described steps in reverse order. To wit, the determination starts by entering the chart at the desired viscosity value on the vertical scale, reading horizontally from this value to a point of interception with line 16, and reading vertically from such point to the corresponding percentage values of A and B which are given at the bottom of the chart by the horizontal percentage scale.

From the above, it will be seen that the employment of a Fisher-Tag chart involves an interpolation between two known values. It also should be evident that such two known values are known values of a non-linear function. This last stated fact can be demonstrated as follows. In the chart of FIGURE 1 construct, as shown, a diagonal 25 from the lower left-hand corner to the upper right-hand corner of the chart. This diagonal intercepts at various points the horizontal lines representing the various viscosity values set forth in the vertical scale. Each of such points of interception may be considered to represent a pair of values of which the first is the viscosity value indicated by the horizontal line intercepted, and of which the second value is the actual displacement of this horizontal line from the base line 16 of the chart of FIGURE 1. Therefore, such points of interception may be plotted in the manner shown in the accompanying FIGURE 2, wherein viscosity and displacement values are respectively represented by linear horizontal and linear vertical scales. When such points of interception are plotted in relation to the scales just mentioned of FIGURE 2, the result is the continuous and curved line 30 shown in the figure. It is evident that such line 30 represents a relationship wherein the variable of actual displacement on the Fisher-Tag chart is considered to be a non-linear function of the variable of viscosity value.

As stated in connection with FIGURE 1, the points 14 and 15 represent viscosity values of 250 and 100 Saybolt seconds of the pure oils A and B, respectively. These points 14 and 15 may be located on the non-linear function line 30 in FIGURE 2 at the places thereon which, according to the horizontal viscosity scale, correspond to the mentioned viscosity values. When the points 14 and 15 are so located on line 30, then the vertical interval 31 between such points 14 and 15 will be an interval representing the actual value of vertical displacement between the same points 14 and 15 in the chart of FIGURE 1. Therefore, if in FIGURE 2 the whole interval 31 is marked off into equal percentage intervals in the manner shown, the total vertical displacement in this figure between points 14 and 15 will be subdivided on a percentage basis in the same way as the total vertical displacement component of the line 16 in FIGURE 1 is, in effect, subdivided on a percentage basis into equal percentage intervals. The line 16 can be considered to be so subdivided for the reason that such line has equal increments of vertical displacement component for equal percentage intervals taken in the horizontal percentage scale of FIGURE 1.

It follows that the FIGURE 2 diagram may be employed for interpolation purposes in much the same way as the FIGURE 1 chart. Thus, using FIGURE 2, if it desired, as before, to determine the viscosity value of a blend formed of 50% of oil A and 50% of oil B, this may be done by constructing, from the 50% mark on interval 31, a horizontal line 32 which intercepts curved line 30 at point 33, thereafter constructing from point 33 a vertical line 34 which intercepts the horizontal viscosity scale at point 35, and thereafter reading from this horizontal viscosity scale the viscosity value represented by the point 35.

While graphical methods of the sort outlined above are in common use for the purpose of interpolating from known to unknown values in problems involving non-linear functions, such graphical methods are subject to certain disadvantages. Among these might be mentioned the slowness and tediousness which inherently characterize graphical methods. Also, there is a tendency in graphical interpolation for the results obtained to become inaccurate when the interpolation is made under the condition that there is only a small distance of separation between the two points on the graphed non-linear function which are the known points used in the interpolation.

It is accordingly an object of the invention to overcome the mentioned and other disadvantages of graphical interpolation. Another object of the invention is to substitute for graphical interpolation an interpolation performed electrically by computer apparatus. Still another object of the invention is to provide computer apparatus which is adapted not only to indicate the results of a performed interpolation, but which is adapted as well to control industrial processes in accordance with such results.

These and other objects are realized, according to the invention, by providing electric analog apparatus comprised of at least one non-linear potentiometer, positionally adjustable means including at least one sliding contact which is adjustable in position along the electrical length of the non-linear potentiometer, linear potentiometer means, including tap means, which is positionally adjustable over the electrical length of the last named potentiometer means, and indicating means associated with such tap means. The non-linear potentiometer is adapted to develop over its electrical length a non-linear voltage variation which represents a non-linear function in connection with which an interpolation is to be made. The positionally adjustable means cooperates with the non-linear potentiometer in such manner that such means is adapted, by being adjusted to two selected positions, to establish two voltage supply points. These points supply respective voltages of respective values which are related to the non-linear voltage variation on the non-linear potentiometer to represent that pair of known value points of the non-linear function which are the end points of the contemplated interpolations.

The linear potentiometer means is connected at opposite ends to these two voltage supply points to be energized by the voltages therefrom. The tap means on the linear potentiometer means is thereby adapted to provide an output voltage which is a function both of the difference between the voltages from the said supply points and of the positional adjustment of such tap means on the electrical length of the linear potentiometer means. This output voltage is supplied to the mentioned indicating means which is connected to the tap means to be responsive to a difference between the output voltage therefrom and an interpolation voltage which has a value intermediate the values of the voltages from the mentioned supply points. The interpolation voltage thereby represents a value point of said function lying intermediate the two known value points thereof.

The indicating means is adapted to indicate when equality of value exists between the output voltage from the mentioned tap means and the mentioned interpolation voltage. This equality condition between the two voltages is obtained as a result of adjustment of one or the other or both of the values of the interpolation voltage and of the position of the tap means on the linear potentiometer means. By so bringing into equality the values of the interpolation voltage and the output voltage from the tap means, it is possible to simulate in an electrical manner the mathematical operation of interpolation. For example, if the tap means is adjusted in position on the linear potentiometer means to represent a value point of the non-linear function which, in terms of one variable of the function, is located halfway between the two known value points thereof, then, by bringing the interpolation voltage into equality with the output voltage from the tap means, and by relating this interpolation voltage value to the position on the electrical length of the non-linear potentiometer which manifests this same voltage value, it is possible to determine the value at this intermediate point of the function for the other variable of the non-linear function.

As a feature according to the invention, the electric analog computer apparatus may be characterized by circuitry which avoids loading of the non-linear potentiometer by the linear potentiometer means.

As another feature, according to the invention, the indicating means may be of a type whereby such means is adapted to perform a control function as well as an indicating function.

For a better understanding of the invention, reference is made to the following description, to the previously mentioned figures of the drawings, and to the figures of the drawings which have not been previously mentioned, and wherein.

Figure 3:
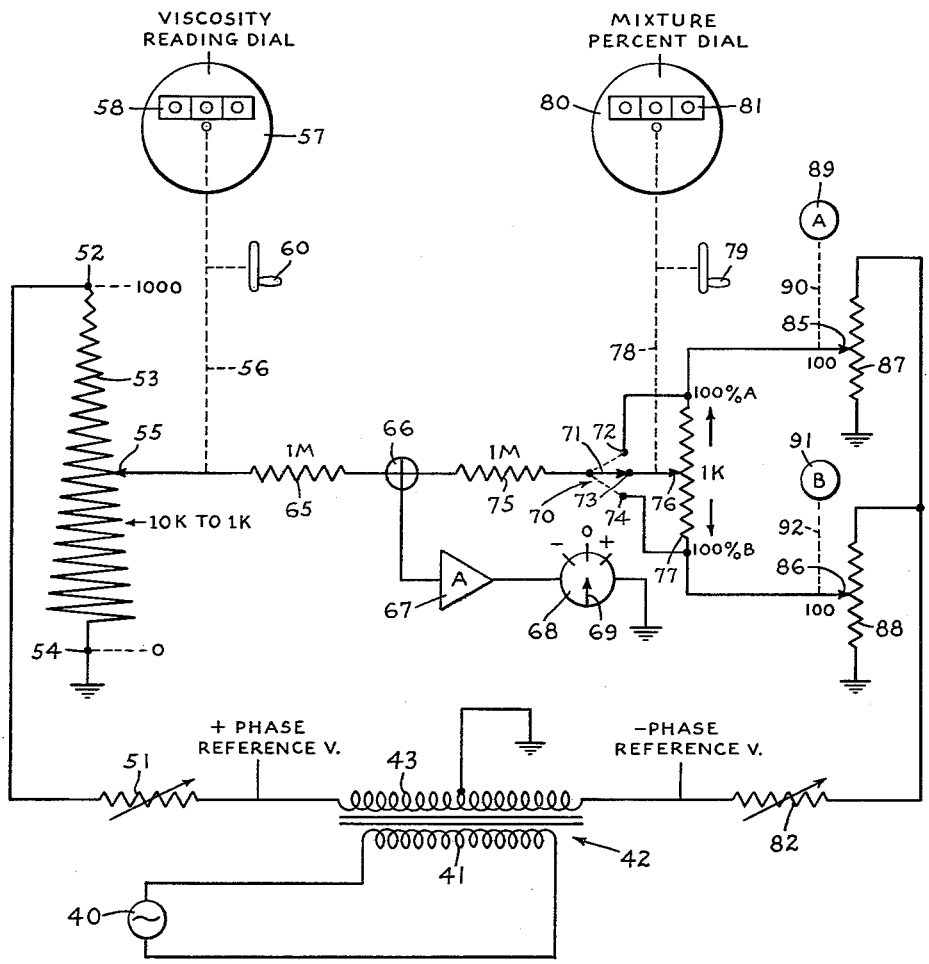
FIGURE 3 is a schematic diagram of an embodiment if the invention.

FIGURE 3 will first be considered. In the embodiment shown in this figure, a source 40 of 110 volt, 60 cycle electrical energy is connected across the primary 41 of a transformer 42 having a secondary 43 which is connected at its center to ground. The secondary 43 represents a balanced voltage supply wherein the alternating voltages at opposite ends of the secondary are of equal amplitude but of opposite phase in respect to ground. For convenience, the respective voltage outputs from the left-hand and right-hand ends of secondary 43 will be considered as, respectively, the reference voltage of positive phase and the reference voltage of negative phase. Both voltages may have a value of 24 volts.

The positive phase reference voltage is supplied through a voltage-adjusting variable resistor 51 to one terminal 52 of a non-linear potentiometer 53 whose other terminal 54 is connected to ground. A sliding contact 55 for potentiometer 53 is mechanically coupled to a driving shaft 56. Shaft 56 may be rotated by turning crank 60 to move contact 55 over the electrical length of potentiometer 53 in an amount which is directly proportional to the angular displacement of the shaft.

Also coupled to the shaft 56 is a reading dial 57 which will be referred to herein as the "viscosity reading dial." The dial 57 has a window 58 through which may be read the values registered by the dial. These values change in direct proportion to the angular displacement of shaft 56. Moreover, these registered values provide a direct reading of viscosity values in Saybolt seconds. The coupling between contact 55, shaft 56 and dial 57 is such that the dial registers a reference zero value of "000" when the contact 55 is at a reference zero position on potentiometer 53 as, say, at the end terminal 54. As the contact is moved upward from this reference position, the values registered by dial 57 increase in direct proportion. Therefore, the movement of contact 55 over potentiometer 53 and the concurrent change in values registered by dial 57 may both be considered representative of plotting movement in FIGURE 2 in the direction of the horizontal scale of viscosity values.

The potentiometer 53 is characterized from terminal 52 to terminal 54 by a distribution over its electrical length of voltage values to ground. This distribution of voltage values may be determined by moving the contact 55 over the electrical length of the potentiometer, and by reading out the various voltages appearing on contact 55 at the various positions assumed thereby. Under these circumstances, the voltage output from tap 55 can be considered a function of the displacement of contact 55 over the electrical length of potentiometer 53 from the reference position for the contact at the end terminal 54. Moreover, since such displacement of contact 55 is directly proportional to the angular displacement of shaft 56, and since the viscosity reading dial 57 provides a numerical reading which is directly proportional to the angular displacement of this last named shaft, the voltage output from contact 55 can likewise be considered a function of the amount by which the reading of dial 57 has changed from its reference value of "000."

According to the invention, the potentiometer 53 is constructed to provide, over its electrical length, a distribution of voltage values of such character that, when the voltage output from contact 55 is considered as a function of the value of the quantity registered by dial 57, this function will be a non-linear one which simulates a given non-linear function in connection with which it is desired to perform interpolations. In these circumstances, the value of the mentioned voltage output and the value registered by dial 57 will simulate, respectively, the value of the dependent variable and the value of the independent variable of the given non-linear function.

There are various constructions for the potentiometer 53 which will suitably realize this desired non-linear relationship between the voltage output from the potentiometer contact and the registered value of a reading dial which is driven in proportion to the displacement of the contact. For example, the non-linear potentiometer 53 may, if desired, take the form of a multiple tap potentiometer as disclosed, for example, on pages 322 and 323 of the text "Electronic Analog Computers" by Korn and Korn (McGraw Hill Book Company, Inc., 1956). However, in the shown embodiment, the potentiometer 53 is rendered non-linear by the use of shaped windings as disclosed on page 314 of the mentioned text.

In the present instance, the potentiometer 53 and associated components are constructed to simulate the non-linear function represented by the function line 30 in the accompanying FIGURE 2. In other words, when the shaft 56 is rotated by crank 60 to cause the values registered by dial 57 to undergo a progressive increase from the reference value of "000," the synchronous movement of contact 55 along potentiometer 53 produces in the output voltage from the contact a progressive change of value which is so related to the dial readings that the characteristic of output voltage vs. dial reading conforms to the characteristic of displacement vs. viscosity value which is represented by line 30 in FIGURE 2.

Returning to a consideration of the construction of the FIGURE 3 computer, the contact 55 is connected through the isolating resistor 65 to a "summing point" which is represented by the junction 66. The amount by which the amplitude of the voltage at summing point 66 departs from ground value is measured by a circuit comprised of an A.C. amplifier 67 and a null indicating instrument 68 responsive to the output of the amplifier. The instrument 68 may be an A.C. voltmeter having an indicating needle 69 which is deflected rightward and leftward of a central reference position when the voltage at point 66 differs from ground value and is of positive and negative reference phase, respectively.

In addition to being coupled to amplifier 67, the summing point 66 is coupled to an isolating resistor 75 (equal in resistance value to resistor 65) and, through resistor 75, to a tap means of a linear potentiometer means. In the FIGURE 3 embodiment, the linear potentiometer means and tap means are in the form of a single linear potentiometer 77 having a tap 76 thereon. If desired, there may be interposed between resistor 75 and tap 76 a switch 70 having a movable contact 71, a middle fixed contact 73 connected to tap 76, and upper and lower fixed contacts 72, 74 which are respectively connected to the upper and lower ends of potentiometer 77.

The tap 76 is adapted to be moved by rotation of a shaft 78 over the electrical length of potentiometer 77 in an amount which is directly proportional to the angular displacement of the shaft. The rotation in either direction of the shaft 78 may be accomplished by the turning of crank 79. When the shaft 78 is so rotated, the angular displacement thereof is registered by a dial 80 having a window 81 through which may be viewed the numerical values registered by the dial. In the embodiment, the dial 80 is employed to provide direct readings of the percentage of constituent A in a blend of constituents A and B. Hence, the dial 80 will be referred to herein as the "mixture percent" dial.

Consonant with its intended purpose, the values registered by dial 80 are representative of percentage values. These percentage values are related to the movement of tap 76 over potentiometer 77 in such manner that the registered percentage values are directly proportional to the tap movement. Furthermore, the dial 80 registers 0% and 100% for constituent A when, respectively, the tap 76 is positioned at the lowermost and the uppermost extremes of the potentiometer 77.

These upper and lower extremes of potentiometer 77 are respectively connected to the taps 85 and 86 of a pair of potentiometers 87 and 88 which are each connected at one end to ground, and which are each connected at the other end, through the voltage-adjusting variable resistor 82, to the right-hand end of the secondary-winding 43. It will be recalled that this right-hand end of the secondary is the end which supplies the reference voltage of negative phase.

The tap 85 may be adjusted in position on potentiometer 87 by rotation of a knob 89 which is coupled to tap 85 by the shaft 90. Similarly, the tap 86 may be adjusted in position on the potentiometer 88 by rotation of a knob 91 which is coupled to tap 86 by the shaft 92. As explained hereafter, the knobs 89 and 91 are employed to enter into the computer apparatus of FIGURE 3 the viscosity values for the constituents A and B, respectively.

The apparatus of FIGURE 3 is operated in the following manner for the purpose of obtaining viscosity data on various blends constituted of the different viscosity oils A and B. As a first step, the viscosity value of oil A is entered into the computer. This is done initially by turning crank 60 until the viscosity value registered by dial 57 is that of the oil A, namely 250 Saybolt seconds. Under these circumstances, the contact 55 will provide an output voltage which corresponds in value to the value in the vertical ordinate for the point 14 in FIGURE 2. Note that this voltage value is produced by voltage of positive phase.

Following the setting of contact 55, the positive phase voltage therefrom is neutralized at summing point 66 by the following procedure. The movable contact 71 of switch 70 is thrown to close with upper fixed contact 72 to thereby connect point 66 to the upper end of linear potentiometer 77. Then the knob 89 is turned to adjust tap 85 to the position on potentiometer 87 where the instrument 68 indicates by a null that the voltage at summing point 66 is at ground value. When point 66 is at ground value, the negative phase voltage between tap 85 and ground will necessarily be of an amplitude which equals that of the positive phase voltage between the contact 55 and ground. Hence, like the voltage between contact 55 and ground, the negative phase voltage between tap 85 and ground is representative of the value in the vertical ordinate of FIGURE 2 of the point 14 which corresponds to the oil A.

The viscosity value for the oil B is next entered into the computer as follows. The crank 60 is turned until the dial 57 registers 100 Saybolt seconds which is the viscosity value for oil B. Thereafter, the contact 71 is thrown to close with contact 74 to thereby connect point 66 to the lower end of potentiometer 77. Following this, the knob 91 is turned to adjust the tap 86 to the position on potentiometer 88 where the instrument 68 indicates by a null that the voltage at summing point 66 has been adjusted to ground value. When tap 86 has been so adjusted, the negative phase voltage between this tap and ground will be representative of the value in the vertical ordinate of FIGURE 2 of the point 15 which corresponds to oil B.

From what has been said, it will be seen that the described adjustment of taps 85 and 86 serve to establish at the taps a pair of voltage supply points. These two points provide two separate, negative-phase voltages whose values respectively correspond to the values in the vertical ordinate of FIGURE 2 of the points 14 and 15 which correspond to the oils A and B. The linear potentiometer 77 is connected between these two voltage supply points. Also, the "mixture percent" dial 80 is calibrated to register 0% and 100% for oil A when the tap 76 is at the lower and upper end, respectively, of the linear potentiometer 77. Therefore, the linear potentiometer 77 and associated components are simulative of the percentage divided vertical interval 31 in FIGURE 2.

Assume now that it is desired to determine with the FIGURE 3 computer the viscosity value of the blend which will result by mixing together 50% of oil A and 50% of oil B. This is done by entering into the computer the given data of a 50%, 50% mixture by the procedure of turning the crank 79 until the dial 80 registers the value of 50% for oil A. When the dial 80 has been adjusted to this reading, it will be evident that the tap 76 will receive from potentiometer 77 a voltage to ground which is of negative reference phase, and which, in amplitude, has a value corresponding to the vertical displacement in FIGURE 2 of the 50% mark on the interval 31 from the base line of the figure.

As is evident from FIGURE 2, the next step in graphical interpolation is to establish that point on the function line 30 which has the same displacement in the vertical coordinate as the mentioned 50% mark on interval 31. This step is simulated in FIGURE 3 computer by first throwing movable contact 71 to close with middle fixed contact 73 to connect tap 76 to point 66. Then, crank 60 is turned to adjust contact 55 in its position along non-linear potentiometer 53 until the instrument 68 indicates by a null that the positive phase voltage at contact 55 just balances in amplitude the negative phase voltage at tap 76 to thereby bring to ground value the net voltage which is manifested at the summing point 66. When this condition of balance has been reached, the FIGURE 3 computer has, in effect, established the position of the point 33 of FIGURE 2.

The determination is, of course, not yet complete, since it is necessary to ascertain the viscosity value for the blend which is represented in the horizontal ordinate by the point 33. However, while the ascertainment of this viscosity value for the blend requires the additional graphical step in FIGURE 2 of constructing the vertical line 34, in the FIGURE 3 computer the ascertainment is made by merely reading the viscosity value which is registered by the dial 57 after the contact 55 has been adjusted as described.

Obviously, instead of employing the computer to determine the viscosity value of a blend of oils A and B which are mixed together in a predetermined relative percentage relation, the computer may be used to determine the relative percentages of oils A and B in the blend which is required to produce some particular desired viscosity value for the blend. This latter determination is made by carrying out, as before, the above outlined steps of setting the taps 85 and 86 in accordance with the known viscosity values of the pure oils A and B. Thereafter, the procedure differs from that previously described in that the next setting which is made is that of the dial 57. This dial is set to the particular desired viscosity value for the blend. When dial 57 has been so set, the switch 70 is thrown to connect tap 76 to point 66, and the crank 79 is then turned to adjust tap 76 to the position on linear potentiometer 77 where instrument 68 indicates that the voltage from tap 76 just balances out, at summing point 66, the voltage developed on contact 55. When this position for tap 76 has been found, the value registered by dial 80 will be the percentage value of oil A required in the blend to give the viscosity value for the blend which has been entered into the computer by the setting of dial 57.

From the above description of the construction and operation of the FIGURE 3 computer, it will be appreciated that an interpolation computer according to the invention has the following advantages over graphical methods of interpolation in instances where it is desired to determine unknown value points of a non-linear function. First, an interpolation computer according to the invention provides quick results, requires no special skill to operate, and is free of the errors which occur in graphical methods because of inaccurate location of the lines and points used in the interpolation. Second, a computer according to the invention is adapted to provide convenient percentage interpolation between two known value points of a non-linear function for various distances of separation between these two known points. This cannot be as conveniently done by graphical methods, when a non-linear function is represented in the manner shown by FIGURE 2, since, with graphical methods, each new distance of separation requires a repetition of the procedure of dividing the separation distance into equal percentage intervals. Third, in contrast to graphical methods, as the separation distance between the two known points of the non-linear function becomes smaller, the absolute value of the accuracy of interpolation of a computer according to the invention does not become less, but, instead, becomes greater.

Figure 4:
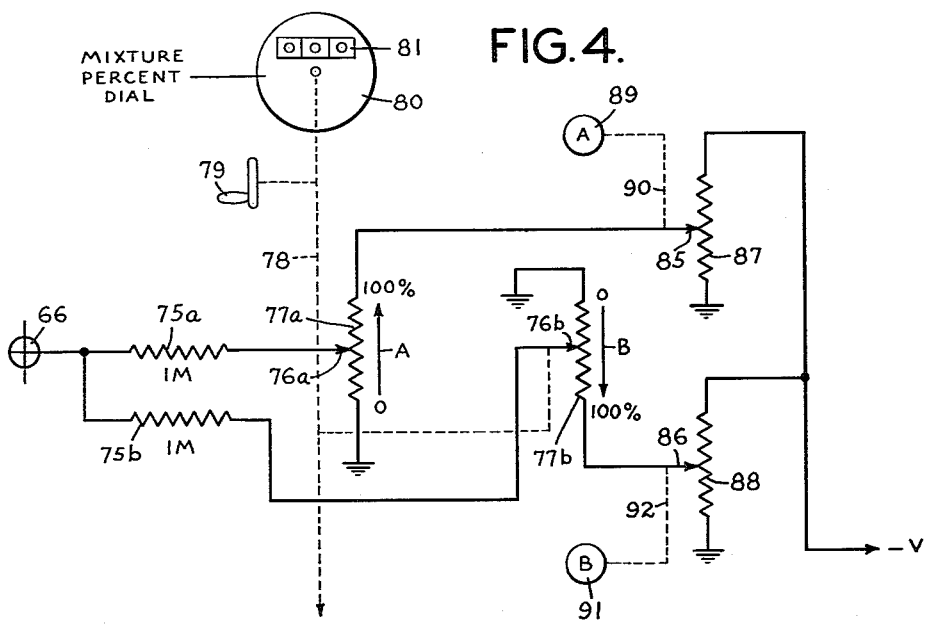
FIGURE 4 is a schematic diagram of a modification of the embodiment shown in FIGURE 3.

FIGURE 4 shows a modification of the FIGURE 3 embodiment wherein the single linear potentiometer 77 of FIGURE 3 is replaced by a pair of similar linear potentiometers 77a and 77b which are each connected at one end to ground, and which, at the other end, are respectively connected to the tap 85 and the tap 86. As other changes in the FIGURE 4 modification the switch 70 is omitted, and the resistor 75 and tap 76 of FIGURE 3 are respectively replaced by a pair of similar resistors 75a, 75b and by a pair of similar taps 76a and 76b for, respectively, the potentiometers 77a and 77b. As shown, the resistors 75a and 75b respectively couple the taps 76a and 76b to the summing point 66.

In FIGURE 4, shaft 78 is coupled to both of taps 76a and 76b to impart equal mechanical displacement to both such taps when the shaft is rotated at a given amount. However, the potentiometers 77a and 77b are so connected (with opposite ends grounded) that a mechanical displacement of the taps which increases the voltage on, say, tap 76a, will decrease the voltage on tap 76b. It follows that, as the taps are moved from one extreme to the other of the potentiometers 77a, 77b, the voltage contributed by these potentiometers and taps to summing point 66 will linearly vary with the mechanical displacement of taps 76a, 76b in the same manner as does (FIGURE 3) the voltage contributed to summing point 66 by the single tap 76 and single potentiometer 77.

Figure 5:
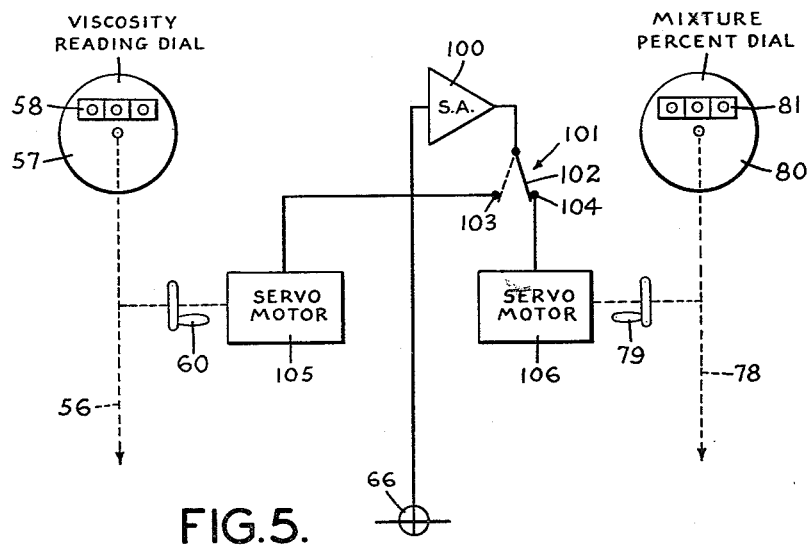
FIGURE 5 is a schematic diagram of another modification of the FIGURE 3 embodiment.

FIGURE 5 shows another modification of the FIGURE 3 embodiment. In this latter modification, the instrument amplifier 60 and instrument 68 of the FIGURE 3 embodiment are replaced by a servo system comprised of the servo amplifier 100, the switch 101 having a movable contact 102 and a pair of fixed contacts 103, 104, a servomotor 105, and a servomotor 106. The servo amplifier 100 is connected to provide an ouptut corresponding to the amplitude and phase of the voltage appearing between the summing point 66 and ground. This output may be selectively connected to drive either motor 105 or motor 106 by selectively throwing the movable contact 102 of switch 101 to close with the fixed contact 103 or the fixed contact 104, respectively. Each motor will rotate in a direction and with a speed which are respectively determined by the phase and amplitude of the output signal from the servo amplifier which is supplied to the motor. The motors 105 and 106 are mechanically connected to respectively drive the shafts 56 and 78.

The servo system of FIGURE 5 operates in the following manner. Assume that it is desired to determine the viscosity of a blend formed of oils A and B having a given relative percentage content in the mixture, and that, consonant with this determination (and, as previously described), tap 76 has been connected through switch 70 to point 66, and the crank 79 (FIGURE 3) has been turned to set the tap 76 at the position on potentiometer 77 where this predetermined relative percentage content of oils A and B is indicated by the percentage value registered by the "mixture percent" dial 80. In this instance, the movable contact 102 is thrown to close with fixed contact 103. In consequence, the servomotor 105 drives shaft 56 until contact 55 has been moved in an appropriate amount and direction over non-linear potentiometer 53 to come to the position where the positive phase voltage on contact 55 balances at point 66 the negative phase voltage developed on tap 76. As previously described, when contact 55 reaches this position where voltage balance is obtained, the value registered by the dial 57 will be the viscosity value of the blend constituted of the oils A and B in the predetermined relative percentage content which has been entered into the computer by the crank 79.

Assume, on the other hand, that the desired viscosity value for the blend is known, but that the relative percentages of the oils A and B which will yield this viscosity value is the factor which is unknown. In this latter instance, the given viscosity value for the blend is entered into the computer by turning crank 60 until such viscosity value is registered by the "viscosity reading" dial 57, and the tap 76 is connected through switch 70 to point 66. Then, in this latter instance, the movable contact 102 is thrown to close with fixed contact 104 to thereby energize motor 106. The motor 106 thereupon operates through shaft 78 to drive tap 76 over linear potentiometer 77 until the negative phase voltage on this tap just balances at summing point 66 which the positive phase voltage appearing on contact 55. Under these laterally described circumstances, the percentage value registered by "mixture percent" dial 80 will be the percentage value of oil A which is required in the blend to give the viscosity value for the blend which has been entered into the computer by the crack 60.

It is evident that the servo system of FIGURE 5 may be used, not only to control the positions of one or both of contact 55 and tap 76, but, in addition, to control industrial processes. For example, in response to an input to the computer by shaft 56 of a desired viscosity value for a blend of two given oils, the servomotor 106 may operate to so control a mixing valve (not shown) that the oils are mixed together in proper proportion to yield the desired viscosity value for the blend.

The above described embodiments being exemplary only, it will be understood that the invention disclosed herein comprehends embodiments which differ in form and/or detail from the above described embodiments. For example, the taps 85 and 86, instead of being slidable over the potentiometers 87 and 88, may be disconnected therefrom and may be reconnected to be independently slidable over the non-linear potentiometer 53. As a concomitant to the change just mentioned, the indicating instrument 68 may be connected to indicate any difference in voltage between the respective voltages which appear on the taps 55 and 76. In such changed embodiment, the taps 85 and 86 are adjusted in position on the non-linear potentiometer 53 to respectively represent the two known value points of the non-linear function simulated by the last name potentiometer, and the taps 55 and 76 are used as previously described to simulate the mathematical operation of interpolation. Other modifications will occur to those skilled in the art. Accordingly, the invention is not to be considered as limited save as is consonant with the scope of the following claims.

I claim:

1. A computer for interpolating between two known value points of a non-linear function, said computer comprising, a non-linear potentiometer having a contact adjustable in position over the electrical length thereof, and adapted to provide over said length a variation in voltage which simulates said function, means to adjust said contact over said electrical length to two selected positions at which the voltages therefrom, relative to a reference voltage value, are respectively representative of said two known points, a pair of adjustable voltage supplies each adapted to be adjusted in the voltage, relative to said reference value, which is manifested thereby, means to adjust the voltages from said supplies relative to said reference value to correspond with the voltages from said contact at said two positions, linear potentiometer means connected to both said voltage supplies and having tap means which is slidable thereover to provide as an output a variable percentage of the difference in voltage value between the voltage from said supplies, means to adjust the position of siad tap means on said linear potentiometer means, and electrical means operably coupled to said tap means and contact and responsive to unbalance of the voltages respectively manifested thereby to indicate any such unbalance, said last named means being further adapted to indicate when said last named voltages have been rendered in balance to thereby simulate an interpolated point of said non-linear function.

2. A computer as in claim 1 in which said linear potentiometer means and tap means are respectively in the form of a single potentiometer and a single tap adjustable in position on said single potentiometer.

3. A computer as in claim 1 wherein said linear potentiometer means is in the form of a pair of similar linear potentiometers each connected at one end to a common voltage point and respectively connected at the other end to one and the other of said voltage supplies, and in which said tap means is in the form of a pair of mechanically ganged taps which are respectively slidable over said two linear potentiometers to provide respective voltage outputs which vary in opposite directions in response to a ganged change in position of said taps, said taps being electrically coupled together to conjointly provide as an output said variable percentage of the difference in voltage between said supplies.

4. A computer as in claim 1 wherein said electrical means is in the form of a measuring instrument adapted to indicate by a null an attained condition of balance between the voltages respectively manifested by said contact and by said tap means.

5. A computer as in claim 1 wherein said electrical means is in the form of a servo-system responsive to unbalance between the voltages from said tap means and contact to adjust in position at least one of said tap means and said contact until said last named voltages are brought into balance.

6. A computer as in claim 5 wherein said servo-system includes a servo-motor, and wherein said servo-motor is mechanically coupled to said contact to adjust the position thereof on said non-linear potentiometer.

7. A computer as in claim 5 wherein said servo-system includes a servo-motor, and wherein said servo-motor is mechanically coupled to said tap means to adjust the position thereof on said linear potentiometer means.

8. A computer as in claim 5 wherein said servo-system comprises, a servo-amplifier responsive to unbalance of the voltages from said contact and from said tap means to provide a motor energizing signal, a pair of servo-motors which are mechanically coupled to, respectively, said contact and tap means to adjust the positions thereof on, respectively, said linear potentiometer and said non-linear potentiometer means when the appropriate servo-motor is energized by said signal, and switch means electrically disposed between said servo-amplifier and servo-motors to supply said signal selectively to one and the other of said motors.

9. A computer for interpolating between two known value points of a non-linear function, said computer comprising, a voltage source having a pair of output terminals providing positive and negative voltages which are balanced in respect to a voltage mid-point, a non-linear potentiometer having a contact adjustable in position over the electrical length thereof and connected between one of said terminals and said mid-point to provide over said length a variation in voltage, relative to said mid-point, which simulates said function, means to adjust said contact to two seletced positions at which the voltages therefrom, relative to said mid-point, are respectively representative of said two known points, a pair of voltage supply potentiometers having taps thereon and each connected between the other of said terminals and said mid-point, linear potentiometer means connected to the taps of both said voltage supply potentiometers and having tap means which is slidable over said linear potentiometer to provide as an output a variable percentage of the difference in voltage value between the voltages on said taps with respect to said mid-point, first and second impedance means connected in series between said contact and said tap means, and electrical means connected between the junction of said impedance means and said mid-point to indicate the voltage of said junction with respect to said mid-point.

References Cited in the file of this patent
UNITED STATES PATENTS
2,714,309    Redemske _____ Aug. 2, 1955